United States Patent [19]

Torre et al.

[11] 3,895,364

[45] July 15, 1975

[54] BUBBLE DOMAIN PROPAGATION CIRCUIT

[75] Inventors: Edward Della Torre, Toronto; Witold Kinsner, Hamilton, both of Canada

[73] Assignee: Canadian Patents and Development Limited, Ottawa, Canada

[22] Filed: May 6, 1974

[21] Appl. No.: 467,237

[52] U.S. Cl. ...................... 340/174 TF; 340/174 SR

[51] Int. Cl.² .......................................... G11C 11/14

[58] Field of Search .............................. 340/174 TF

[56] References Cited

UNITED STATES PATENTS

| | | | |
|---|---|---|---|
| 3,705,394 | 12/1972 | Torre | 340/174 TF |
| 3,737,882 | 6/1973 | Furuoya | 340/174 TF |

*Primary Examiner*—James W. Moffitt

*Attorney, Agent, or Firm*—Edward Rymek

[57] ABSTRACT

Conventional bubble domain memories which have a large capacity and are compact generally employ rotating field propagation circuits. Recently, parallel bar propagation circuits, which move bubbles through domain supporting material under the control of a single oscillating transverse magnetic field, have been developed. The present invention provides a novel series-parallel memory system that uses parallel bar propagation circuits and is controlled by two perpendicular oscillating transverse fields or a single oscillating transverse field. In addition, novel turn-around and transfer circuits which are compatible with the parallel bar propagation circuits and which are simply controlled by the oscillating transverse fields or by bias fields, are provided. Finally, circuits are provided which improve the speed of the recycling of information in the assembly loop of the memory.

17 Claims, 16 Drawing Figures

BUBBLE DOMAIN PROPAGATION CIRCUIT

This invention relates to magnetic bubble domain memories and in particular to novel circuits for use with parallel bar propagation circuits in bubble domain memories.

A bubble domain parallel bar propagation circuits is made up of an overlay pattern of bars of different shapes such that their differing demagnetizing fields make them vary in the magnetic field strength required to reverse their magnetic polarities. One arrangement comprises a series of bars formed of films of material having magnetic proportions e.g. permalloy overlying the film containing the bubbles. It includes long and short bars with the bubbles moving from the vicinity of one bar to the next on application of a suitably shaped varying transverse field.

This type of propagation circuit and a turn-around circuit, as well as their operation is described in more detail in U.S. Pat. No. 3,705,394 issued on Dec. 5, 1972 to Edward Della Torre, assignee to Canadian Patents and Development Limited, Ottawa, Canada, as well as in the publication: "The Parallel Bar Bubble Propagating Circuit," E. Della Torre et al., IEEE Trans. Magn. Vol. Mag-9, No. 3,298–303, September 1973.

One basic memory presently used with magnetic domains consists of a series-parallel (major-minor) memory organization taught by P. C. Michaelis and I. Danylchuk, "Magnetic Bubble Repertory Dialer Memory," IEEE Trans. Magn. Vol. MAG-7 No. 3, 737–740, September 1971. This memory includes a number of storage loops around which the bubbles are made to propagate in a controlled manner. The storage loops are connected to an assembly loop in a perpendicular manner using transfer circuits such that the bubbles may be transferred to the assembly loop or from the assembly loop to the storage loop. Finally the storage loop includes read-in and read-out facilities such that information may be read into the loop by producing appropriate bubbles or read out of the loop by detecting the bubble.

To provide an improved memory using the parallel bar bubble propagation system, it therefore becomes necessary to provide novel circuits which are compatible with the parallel bar system.

It is therefore an object of this invention to provide a circuit for transferring bubbles from one parallel bar propagation circuit to a second parallel bar propagation circuit.

It is a further object of this invention to provide a circuit for transferring bubbles from the end of one parallel bar propagation circuit to a second parallel bar propagation circuit.

It is another object of this invention to provide a circuit for transferring bubbles from the end of one parallel bar propagation circuit to the end of a second parallel bar propagation circuit.

It is a further object of this invention to provide a circuit for transferring bubbles from one end of a parallel bar propagation circuit to the other end of the parallel bar propagation circuit.

It is a further object of this invention to provide a parallel bar propagation memory system which is simple to operate.

It is a further object of this invention to provide a parallel bar propagation memory system which is highly reliable.

These and other objects are achieved in a parallel bar bubble propagation memory having an assembly or major loop and a number of storage or minor loops positioned perpendicular to the assembly loops on the bubble domain supporting material. Novel transfer circuits are provided which connect the loops such that a series of bubbles may be transferred to the storage loops in a parallel manner or again bubbles may be transferred from the storage loops to the assembly loop.

Each loop includes two parallel tracks each consisting of a straight parallel bar propagation circuit in which bubble propagation is achieved using an oscillating transverse magnetic field. Each loop further includes at least one turn-around circuit which switches or transfers bubbles from the end of one track to the end of the other track in the loop. One type of turn-around circuit may include a long and shorter bar in parallel or simply a shorter bar. It is positioned in parallel to the bars in the propagation circuit and approximately symmetrical with respect to the centerline between the tracks. Bubble propagation through the turn-around is control by the same oscillating magnetic field as the propagation circuit.

Each storage loop includes one turn-around circuit at one end and a bubble transfer circuit at the other end. The transfer circuit acts as a turn around circuit when bubble transfer from the storage loop to the assembly loop is not desired, the bubbles thus can be continuously circulated around the storage loops. A first type of transfer circuit includes a construction wherein one section is a bar in parallel with the bars in the storage loop and a second section is a bar or bars in parallel with the bars in the assembly loop and form part of the assembly loop. The first section acts as a turn-around under the control of the storage loop oscillating field, while the second section will transfer a bubble to the assembly line under the influence of a large magnetic field perpendicular to the storage field or will transfer a bubble to the storage loop from the assembly loop under the influence of a large magnetic field in the same direction as the storage field.

A second type of transfer circuit also includes a first and a second section. The first section again includes a bar in parallel to the storage bars and the second section includes a bar or bars which are parallel to the assembly bars and form part of the assembly propagation circuit. However, in the embodiments a protrusion is located on at least one of the bars in the second section, the protrusion being perpendicular to the second section bar. Bubbles are transferred through this circuit to the assembly loop under the influence of a large magnetic field perpendicular to the storage field or are transferred to the storage loop from the assembly loop in two stages, a large magnetic field in the same direction as the storage field moves the bubble to the protrusion and then a large magnetic field perpendicular to the storage field completes the bubble transfer to the storage loop.

The assembly loop includes two parallel bar propagation circuits in parallel to one another, with two turn-around circuits completing the loop. It also include read-in and read-out facilities such that the memory may be loaded or read. However, as the storage loops are normally all connected into one side of the assembly loop, a bubble pump, consisting of alternately disposed parallel bars, is included in the second side of the assembly loop to provide rapid movement of information from one end of the assembly loop to the other.

In a further embodiment the second side of the assembly loop is eliminated completely. At the output end of the single propagation circuit, bubble passage is detected and then the bubble is collapsed; the detector provides a signal to a controlled generator located at the input end of propagation circuit which creates a bubble in the circuit, instantaneously transferring information from one end of the assembly propagation circuit to the other.

In the above memories, the storage loops and the assembly loop are controlled independently by two perpendicular oscillating magnetic fields. In a further embodiment, a single oscillating field which is at an angle of 45° may be employed to control the propagation of the bubbles around the storage and assembly loops. Independent bias fields, such as produced by a current through a conductor located over the transfer circuits, may be used to transfer bubbles between the assembly and storage loop, and vice-versa.

In the drawings:

FIG. 1 is a schematic illustration of a basic memory with a number of storage loops and an assembly loop;

FIG. 2*a* illustrates one embodiment of a turnaround circuit.

FIG. 2*b* represents the oscillating field which achieves bubble switching in the turn-around shown in 2*a*:

FIG. 3*a* illustrates a second embodiment of a turn-around circuit;

FIG. 3*b* represents the oscillating field which achieves bubble switching in the turn-around shown in 3*a*;

FIGS. 4, 5, and 6 illustrate embodiments of a first type of transfer circuit used with parallel bar propagation circuits;

Figure 1:
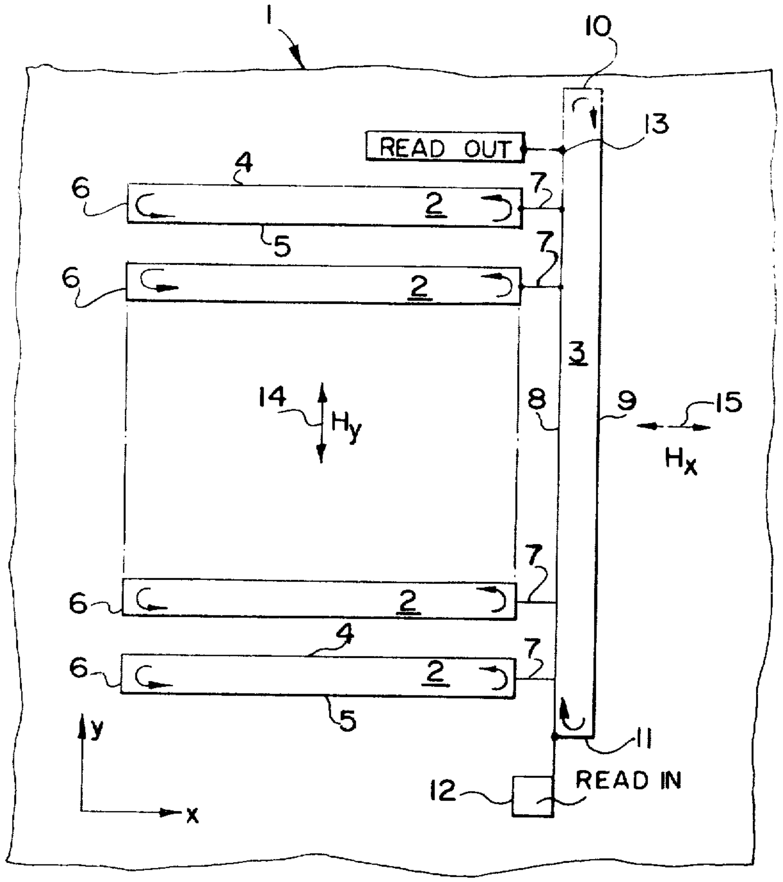

Referring to FIG. 1, the memory 1 includes a number of storage or minor loops 2 and an assembly or major loop 3 which form an overlay over a film of material 1 that will support bubble domains. The storage loop 2 has parallel upper 4 and lower 5 tracks. The tracks may be of the type described in U.S. Pat. No. 3,705,394 mentioned above. Each loop 2 also includes a bubble domain turn-around circuit 6 at one end of the parallel tracks 4,5 and a bubble domain transfer circuit 7 at the other end of the parallel tracks 4,5. The assembly loop 3 also includes two parallel tracks 8 and 9 with a turn-around circuits 10, 11 at the ends of the tracks to complete the loop. The left track 8 has read-in 12 and read-out 13 facilities. Each of the minor loops 2 are located such the tracks 4, 5 are perpendicular to tracks 8, 9, and are connected to the assembly loop by transfer circuits 7.

In operation, an oscillating transverse magnetic field is generated in the y direction, Hy illustrated by arrow 14, causing bubbles to propagate counterclockwise in the storage loops 2.

A second independent oscillating transverse magnetic field is generated in the X direction; Hx illustrated by arrows 15, causing bubbles to propagate clockwise in the assembly loop 3. As parallel bar propagation circuits are only sensitive to transverse magnetic fields parallel to the bars, the Hy field does not affect the bubbles in the assembly loop 3 and the Hx field does not affect the bubbles in the storage loops 2. Thus the bubbles in 2 and 3 can be propagated simultaneously (when both Hy and Hx fields are used) or individually (when either Hy or Hx is applied).

Information is read into the assembly loop 3 by read-in device 12 which creates a series of bubbles in the bubble domain material of the memory. Each bubble, as it is generated, is propagated through the assembly loop by field Hx resulting in a series of bubbles spaced in a predetermined manner. The bubbles are then transferred to the storage loops 2 through transfer circuits 7 and are propagated around the loops 2 by the field Hy. To read out information from the memory, the reverse occurs with the read-out device 13 detecting the bubbles in the assembly loop. The bubbles may be collapsed after they are read-out or they may be propagated around the assembly loop 3 and restored in the storage loops 2.

The propagation circuits as well as the turn-around circuits and transfer circuits may be formed by providing an overlay of magnetic material, preferably permalloy, over a film of material which will support and propagate bubble domains, e.g. rare earth orthoferrite, garnet or cobalt. The overlay may then be etched using a mask to retain permalloy bars on the surface of the bubble domain material in the manner described in the above U.S. Pat. No. 3,705,394. On the other hand, it has been determined that when a negative mask is used and the bars are etched out, the circuits operate equally well and it facilitates the detection of bubble domains. The use of the terms bars, elements and protrusions in this application will include both of these types of construction. In addition, these bars may vary in size or shape to obtain effective propagation as a result of the oscillating transverse magnetic fields controlling the memory.

Figure 2A:
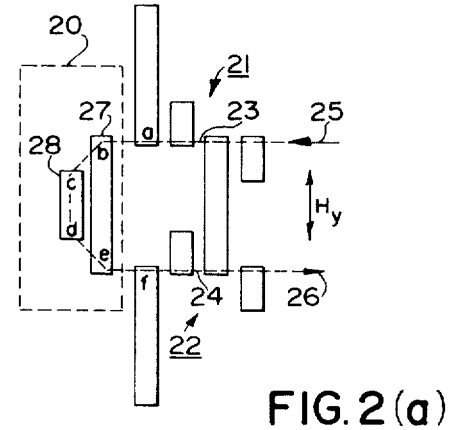

FIG. 2*a* illustrates one embodiment of a turnaround circuit generally shown as 20. It is located at the end of two propagation circuits 21 and 22 that form parallel tracks 23, 24 along which bubbles may propagate in the direction shown by arrows 25 and 26. Turn-around 20 has two parallel elements 27 and 28, element 27 being of the same size as the long bar in the propagation circuit and element 28 being of the same size as the short bar. The spacing between circuit 20 and the ends of the propagation circuits may be up to twice the spacing between the bars. Finally circuit 20 may be symmetrically located about the centerline between tracks 23 and 24, however better interaction between the poles is obtained, resulting in better operating margins, if the turn-around circuit 20 is slightly offset from center.

In operation, the bubble on upper track 23 at point *a* is switched to lower track 24 to point *f* during two cycles of an oscillating transverse magnetic field Hy.

Referring to FIG. 2*a*, it is assumed that a bubble is under the bar labelled *a* during the first half-cycle of the field Hy. As element 27 is magnetized during the second half cycle, bar 27 attracts the bubble which moves to *b*. As element 27 demagnetizes, element 28 remains saturated and the bubble is attracted to *c*. During the third half cycle elements 27 and 28 reverse their polarity and the bubble moves to *d* and then *e* upon saturation. Finally, during the fourth half cycle, the polarities reverse again and the bubble is attracted to *f*, completing the turn.

Figure 3A:
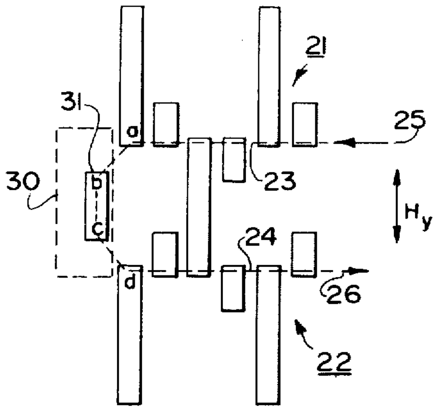

The second turn-around circuit embodiment shown in FIG. 3*a* is similar in principle to the first embodiment. Turn-around is achieved, using a single short bar, during two cycles of the oscillating transverse magnetic field Hy. The propagation path is similar to that of FIG. 2*a* and therefore is represented by identical numbers e.g. propagation circuits 21, 22, upper and lower tracks 23, 24 and propagation directions 25, 26.

In this embodiment, the turn-around circuit 30 consists of a single element 31 in parallel with the bars in propagation circuits 21, 22. Element 30 is wider and longer than the short bar 28 in FIG. 2*a*, in order to approximately obtain the aspect ratio of a short bar because of the distance the bubble must travel.

Though the bubble may be switched from one track 23 to the other 24 with element 31 symmetrically positioned about the centerline between the two tracks, once again better operating margins are obtained if the bar is located slightly closer to one track than the other.

Figure 3B:
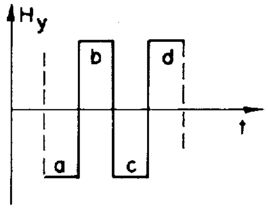

FIG. 3*b* illustrates the switching operation under the control of an oscillating transverse magnetic field Hy. Assume the bubble is at *a* under the end bar in propagation circuit 21 during the first half cycle. During the second half-cycle, the poles reverse and the bubble moves to element 31, point *b*. During the third half-cycle the bubble moves from one end of element 31 to the other end to point *c* and finally it moves to point *d* under the first bar in propagation circuit 22 during the fourth half cycle, to complete the turn-around.

Figure 2B:
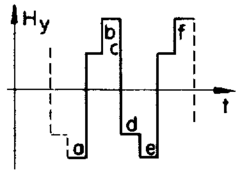

Though the magnetic field is shown as being stepped or square wave in FIGS. 2*b* and 3*b*, other waveforms such as sinusoidal or triangular are equally effective to control the turn-around.

In any memory system, such as shown in FIG. 1, the transfer circuits have a dual function. First, they must operate to switch a bubble from a first track to a second track, thus completing a loop when a transfer is not desired, and it is preferred that this be done using the oscillating transverse magnetic field Hy which controls the rest of the loop. Second, they must operate to transfer a bubble from a first loop to a second loop only when desired. Thus a transfer must not take place due solely to the normal Hx and Hy fields.

Figure 4:
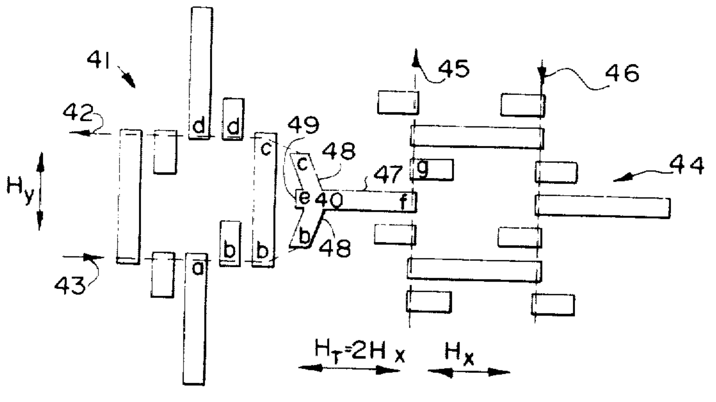
Figure 5:
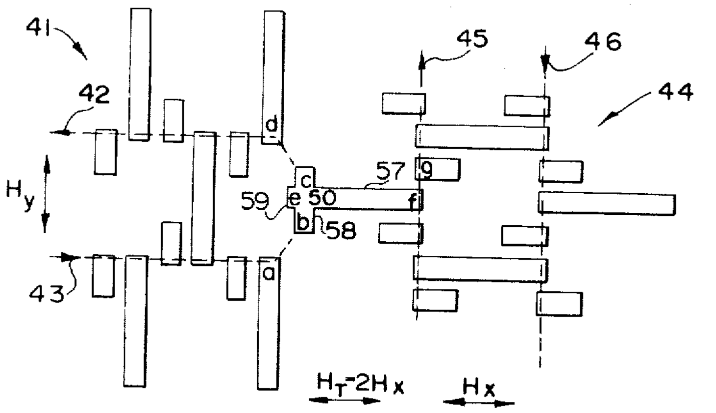
Figure 6:
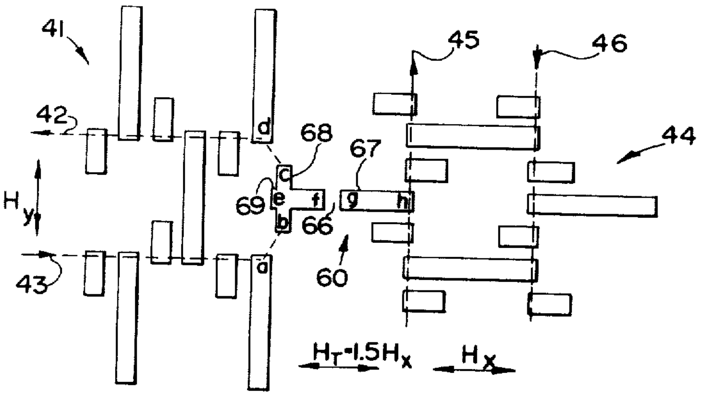

FIGS. 4, 5 and 6 illustrate three embodiments of a transfer circuit which will accomplish this dual function in a similar manner though they are structurally different.

In these figures a section of the storage loop is generally shown as 41 with its oscillating transverse magnetic field Hy and the direction of bubble propagation represented by arrows 42 and 43. A section of the assembly loop is generally shown as 44 with its oscillating transverse magnetic field Hx and the direction of bubble propagation represented by arrows 45 and 46.

The transfer circuit, labelled 40 in FIGS. 4, 50 in FIGS. 5 and 60 in FIG. 6, is generally Y or T shaped and located such that one section is substantially parallel to the bars in the assembly loop and forms part of that loop while a second section is substantially parallel to the bars in the storage loop and effectively functions as a turn-around circuit.

Transfer circuit 40 has a long bar section 47 of approximately the same length as the long bars in the assembly loop 44 and is located so as to replace one long bar in the assembly loop. Element 47 functions to transfer the bubble from loop to loop. A chevron shaped element 48 is located at the end of element 47 such that it is slightly offset from the centerline of element 47 leaving a small protusion 49 above the Y. The chevron element functions as a turn-around circuit.

T-shaped transfer circuit 50 (FIG. 5) has a similar transfer element 57 and a short bar turn element 58. Element 58 is slightly offset from the centerline of element 57 and is located so as to leave a small protrusion 59 above the T.

Transfer circuit 60 (FIG. 6) is identical to transfer circuit 50 except that the transfer element 67 is broken resulting in a small space 66.

Figure 7:
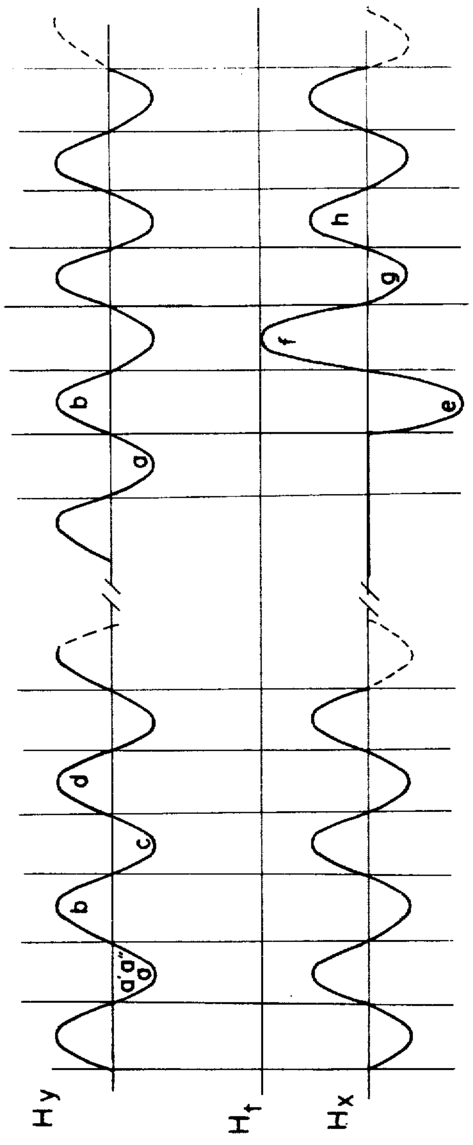
FIG. 7 represents the oscillating fields associated with the operation of FIGS. 4, 5, and 6.

The operation of these transfer circuits will be described in conjunction with FIGS. 7. Hy in FIG. 7 represents the oscillating transverse magnetic field which controls bubble propagation around storage loop 41, while Hx represents the oscillating transverse magnetic field which controls bubble propagation around assembly loop 44. When bubble transfer from storage loop 41 to assembly loop 44 is not desired, a bubble may be switched from the lower track to the upper track of the storage loop through the turn element in the transfer circuit during successive half cycles of the field Hy whether Hx is energized or not. The bubble being at points *a, b, c, d*, shown in FIGS. 4, 5 or 6 during the successive half cycles labelled *a, b, c*, and *d* in FIG. 7. The propagating Hx field does not offset bubble propagation through the storage loop. However, if an Hx field of amplitude H*t* is applied when the bubble is in position *b*, the bubble will be transferred into the assembly loop by successive half-cycles of the Hx field. As shown in FIG. 7, successive cycles *e, f, g, h*, move the bubble to position *e, f, g, h* under the transfer circuits in FIGS. 4, 5, or 6. To transfer a bubble from the assembly loop 44 to the storage loop 41, a large *y*-directed field is applied to the memory. For the transfer circuits in FIGS. 4 and 5, the amplitude of the transfer field H*t* is approximately double the amplitude of the propagation field Hx or Hy and the transfer is completed during one cycle. Transfer circuit 60, FIG. 6, requires a transfer field H*t* of approximately 1.5 Hx, however two cycles are required to complete bubble transfer. The protrusions 49, 59, 69 facilitate the transfer since the position of the bubble under the *y*-directed part of the transfer circuit is immaterial i.e. the bubble is forced under the protrusion when the *x*-directed field is applied. As can be seen in FIG. 7, before half cycle *e*, the Hx-field need not be on if propagation in the assembly loop is not desired.

Figure 8:
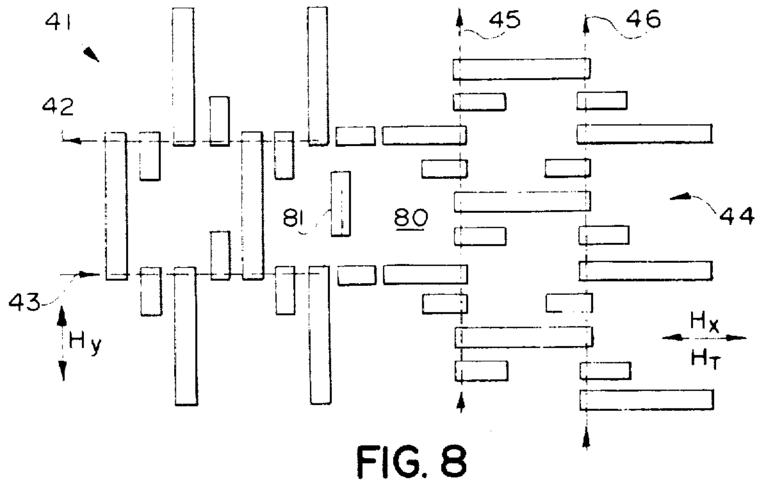
FIG. 8 illustrates a further embodiment of a transfer circuit of the first type.

Another form of transfer circuit is illustrated in FIG. 8. As in FIGS. 4, 5 and 6 FIG. 8 shows portions of a storage loop 41 and assembly loop 44, the direction of bubble propagation arrows 42,43 and 45,46 and the direction of the oscillating transverse magnetic fields Hy and Hx. The storage loop 41 is located with respect to the assembly loop 44 such that the periodicity of the assembly loop 44 matches the periodicity of the storage loop 41. The transfer circuit 80 includes a turn element 81 of the type described in FIG. 3 with the function of switching a bubble from one track to the other in the storage loop. Two pairs of transfer elements 82, 83 and 84, 85 are located at the ends of the upper and lower tracks respectively of the storage loop 41, replacing two of the long bars in the assembly loop 44. Transfer circuit 80 will transfer a bubble from the storage loop 41 to the assembly loop 44 during a period of 2 cycles of an $x$-directed transfer field $H_t$ of amplitude $H_t = 1.5 H_x$ or will transfer a bubble from the assembly loop 44 to the storage loop 41 during a 2 cycle period of $y$-directed transfer field $H_t$ of amplitude $H_t = 1.5 H_y$.

Figures 9, 10:
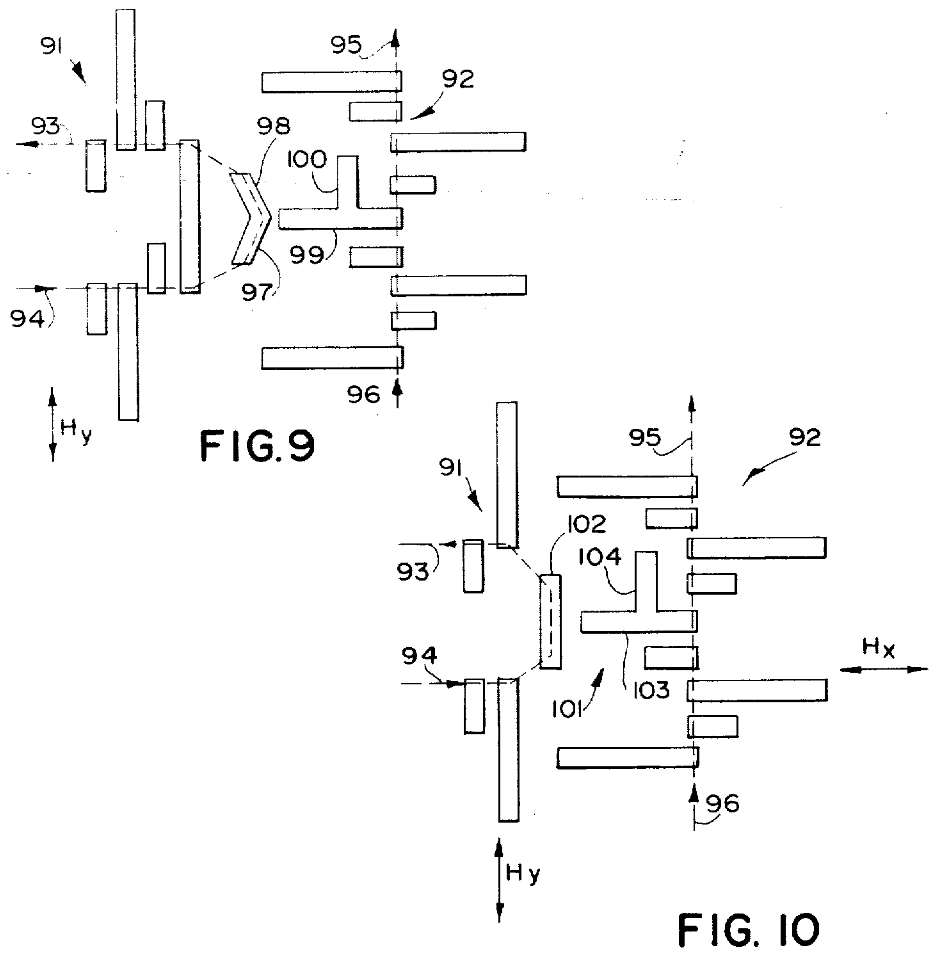
FIGS. 9, 10 and 11 illustrate embodiments of a protrusion type transfer circuit used with parallel bar propagation circuits.
Figure 11:
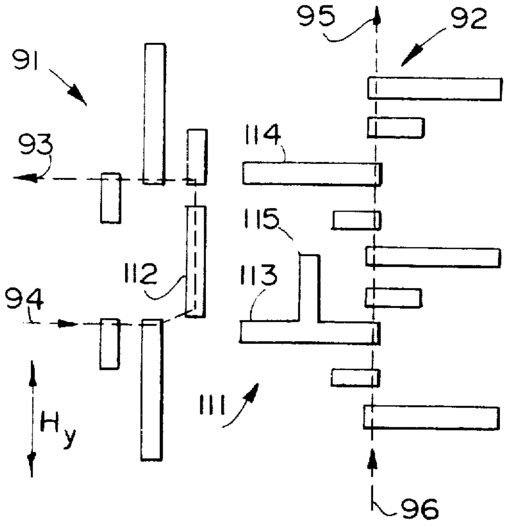

A further type of transfer circuit which improves two directional transfer is illustrated in FIGS. 9, 10 and 11. These three figures show portions of a storage loop 91 and the assembly loop 92 in a memory. The direction of bubble propagation in the storage loop is represented by arrows 93, 94 while the direction of bubble propagation in the assembly loop is illustrated by arrows 95, 96 and the oscillating transverse magnetic fields are represented by $H_x$ and $H_y$.

In particular, the transfer circuit 97 in FIG. 9 includes a chevron shaped turn element 98 with its element 98 slightly offset from the centerline between the tracks in the storage loop 91. A long transfer element 99 is parallel to the bars in the assembly loop 92 and replaces one of its long bars. Element 99 has one end in near contact with the top of chevron shaped turn element 98. The transfer element 99 further includes a protrusion 100 on one side which is perpendicular to element 99.

A second transfer circuit 101 of this type, illustrated in FIG. 10, includes turn element 102 parallel to the bars in storage loop 91 but again slightly offset from the centerline between the tracks in loop 91. A long transfer element 103, parallel to and part of assembly loop 92, has one end spaced from element 102. A protrusion 104 is located on one side perpendicular to element 103.

A third embodiment of a transfer circuit 111 of this type is illustrated in FIG. 11. Transfer circuit 111 includes a turn element 102 parallel to the bars in the storage loop 91 but slightly offset from the centerline between the loop 91 propagation tracks. The transfer circuit 111 further includes two transfer elements 113,114 located at the ends of the lower and upper tracks respectively of the storage loop 91, replacing two of the long bars in the assembly loop 92. One of the transfer element 113 further includes a protrusion 115 to one side of element 113 and perpendicular to it.

The transfer circuits 97, 101 and 111 shown in FIGS. 9, 10 and 11 respectively are similar to the other transfer circuits described above in that they function under the control of large $H_x$ and $H_y$ magnetic fields. In addition, elements 98, 102 and 112 in their respective circuits function as turn-around circuits under the control of a normal $H_y$ field. However they differ in that the protrusion on the transfer bar in each embodiment improves bubble transfer in the two directions. In operation, bubbles are transferred from the storage loop 91 to the assembly loop by the application of one cycle of a large magnetic field in the $x$-direction. The transfer of bubbles from the assembly loop 92 to the storage loop 91 is achieved however, by first applying a large field in the $y$-direction which moves the bubble to the protrusion (100, 104 and 105) and then a field in the $x$-direction which transfers the bubble to the end of the transfer bar (99, 103, or 113) and the bubble enters the storage loop through the turn-around bar (98, 102 and 112) under the influence of a normal $H_y$ field.

The memory system described above including all propagating circuits, turn-around and transfer circuits have been described to operate under the control of two independent oscillating transverse magnetic fields $H_x$ and $H_y$. However, it is within the scope of this invention to provide a single oscillating transverse magnetic field H whose direction is not parallel to either of the loops, storage or assembly, but deviates by 45° from them, thus propagating bubbles through both loops simultaneously. The operation of the parallel bar propagation circuits and the turn-around circuits which are used in these loops whould be the same as described above, however predetermined bias fields would be required to operate the transfer circuits.

Figure 12:
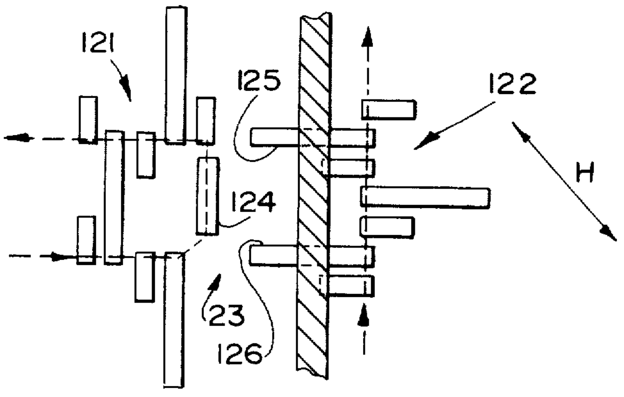
FIG. 12 illustrates a portion of a memory controlled by a single oscillating transverse magnetic field.

An embodiment of a transfer circuit which could be used in a single field H system is illustrated in FIG. 12. 121 represents the storage loop, 122 the assembly loop and H the single oscillating transverse magnetic field. Transfer circuit 123 includes a turn element 124, transfer element 125 and 126, and in addition a current conductor 127 which is perpendicular to the transfer elements 125, 126.

Bubbles are transferred from the storage loop 121 to the assembly loop 122, and vice-versa, by the application of a current in conductor 127. The transfer field due to the electric current is larger than the propagating component of the oscillating field H, and is applied when the bubble transfer is required.

Figure 13:
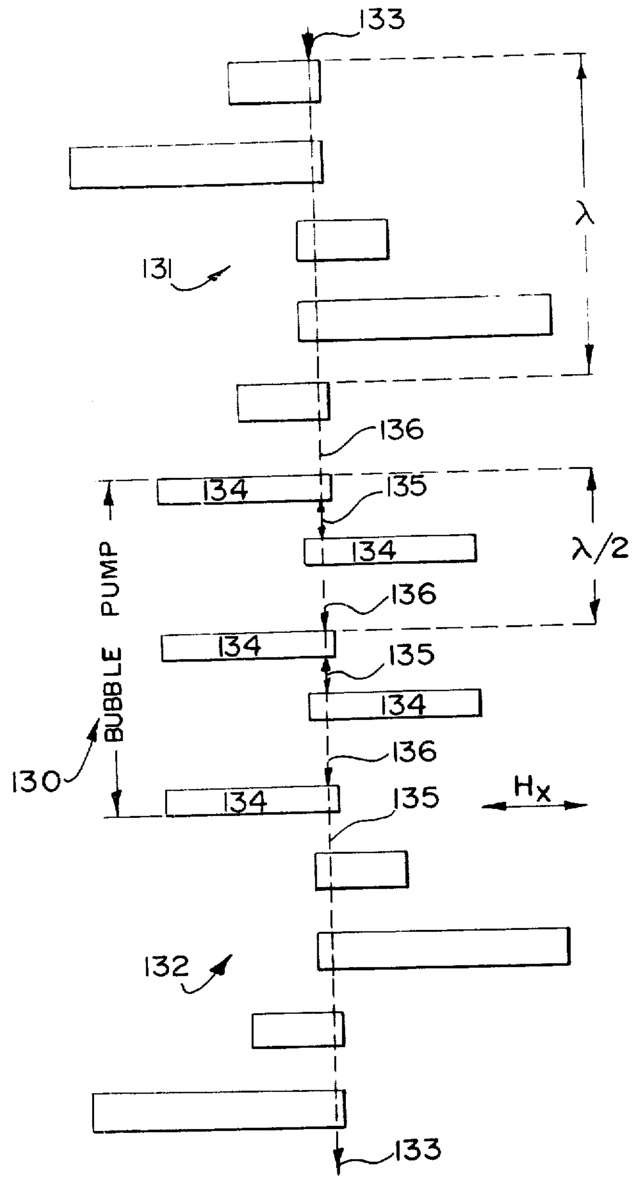
FIG. 13 illustrates a portion of the assembly loop including a bubble pump.

In the memory system described above with reference to FIG. 1, the assembly loop 3 was schematically shown as having two parallel bar propagation circuits 8 and 9 and a pair of turn-around circuits 10 and 11 to complete the assembly loop 3. Normally, the storage loops 2 would be attached to propagation circuit 8 of the assembly loop where transfers would take place, this leaves propagation circuit 9 to recycle information in the form of bubbles from one end of the assembly loop 3 to the other. FIG. 13 illustrates a bubble pump 130 which when inserted between an upper 131 and a lower 132 portion of the right hand propagation circuit in the assembly loop, effectively speeds the recycling of information. Arrows 133 indicate the direction of bubble propagation. The bubble pump consists of a series of parallel bars 134 alternatly spaced to one side and the other of the bubble track. These bars 134 have a width of approximately one-half the width of a propagation circuit bar and a length of approximately two-thirds of a long bar. The spacing between the bars is alternately narrow 135 and wide 136 such that under influence of a normal oscillating transverse magnetic field Hx, bubbles will be trapped in the narrow spacings 135, and a forced transition will occur in the wide spacings 136. As a result, as a bubble enters the pump from one end, a bubble is forced out of the pump at the other end. Thus the information carried by a series of input bubbles will instantaneously be transferred to a series of output bubbles, traversing one side of the assembly loop without delay.

Figure 14:
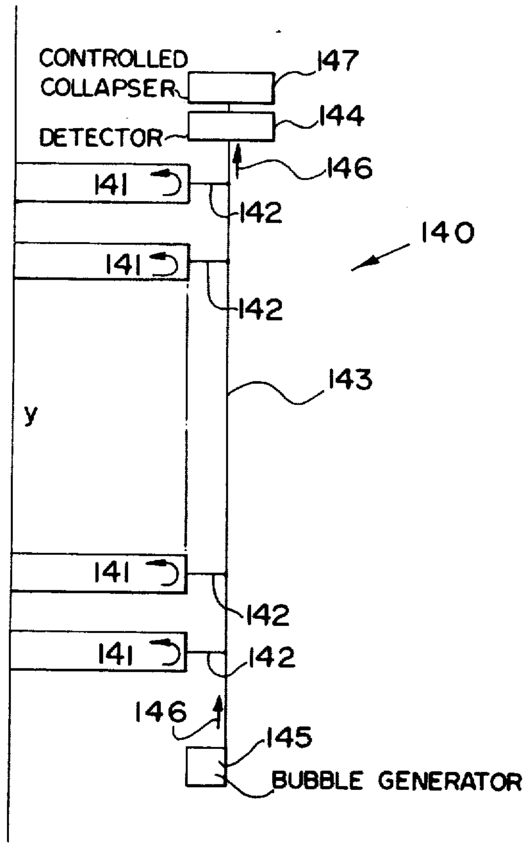
FIG. 14 is a schematic of a one track assembly line.

A second embodiment of a memory in which the recycling of information may be speeded up in an assembly loop is schematically illustrated in FIG. 14. The portion of the memory 140 shown includes storage loops 141 as before with transfer circuits 142 connecting the storage loops 141 to an assembly line 143. In this embodiment, the assembly line 143 is not a closed loop, but includes a detector 144 which upon detection of a bubble controls a bubble generator 145 to produce a further bubble which propagates through the assembly line in the direction indicated by arrow 146. In addition, a controlled collapser 147 is used to eliminate the bubbles leaving the detector so as to avoid the existence of stray bubbles in the bubble material. This embodiment eliminates the need for two turn-around circuits as well as an entire propagation circuit section, leaving only a straight assembly line.

We claim:

1. A magnetic bubble domain memory for storing information in a magnetic bubble domain supporting material comprising:

elongated parallel bar assembly loop means adapted to propagate bubbles in said supporting material under the control of a first oscillating transverse magnetic field perpendicular to said assembly loop means; said assembly loop means having first means adapted to read information into said assembly loop means and second means to read information out of said assembly loop means; and a number of elongated parallel bar storage loop means positioned on one side and perpendicular to said assembly loop means, each of said storage loop means adapted to propagate bubbles in said supporting material under the control of a second oscillating transverse magnetic field perpendicular to said storage loop means and to transfer bubbles to and from said assembly loop means.

2. A memory as claimed in claim 1 which further comprises:

first means adapted to generate said first oscillating transverse magnetic field; and second means adapted to generate said second oscillating transverse magnetic field.

3. A memory as claimed in claim 1 which further comprises:

means adapted to generate an oscillating transverse magnetic field having a first component perpendicular to said assembly loop means and a second component perpendicular to said storage loop means.

4. A memory as claimed in claim 1 wherein said assembly loop comprises:

first parallel bar propagation circuit means;

second parallel bar propagation circuit means positioned parallel to said first propagation circuit means;

first turn-around circuit means positioned at one end of said parallel propagation circuit means and adapted to move a bubble from said first propagation circuit means to said second propagation circuit means under the control of said first oscillating transverse magnetic field; and second turn-around circuit means positioned at the other end of said parallel propagation circuit means adapted to move a bubble from said second propagation circuit means to said first propagation circuit means under the control of said first oscillating transverse magnetic field.

5. A memory as claimed in claim 4 wherein said turn-around circuit means comprises:

a first magnetic bar having a predetermined length; and a second shorter magnetic bar positioned generally parallel and adjacent to said first bar.

6. A memory as claimed in claim 4 wherein said turn-around circuit means comprises:

a magnetic bar having a predetermined length.

7. A memory as claimed in claim 2 wherein each of said storage loop means comprises:

third parallel bar propagation circuit means positioned perpendicular and near to said first parallel bar propagation circuit means;

fourth parallel bar propagation circuit means positioned parallel and adjacent to said third propagation circuit means;

third turn-around circuit means positioned adjacent the ends of said third and fourth propagation circuit means furthest from said first propagation circuit means, said third turn-around circuit means adapted to move a bubble from said third propagation circuit means to said fourth propagation circuit means under the control of said second oscillating transverse magnetic field; and transfer circuit means positioned adjacent the ends of said third and fourth propagation circuit means near said first propagation circuit means, said transfer circuit means adapted to move a bubble from said fourth propagation circuit means to said third propagation circuit means under the control of said second oscillating transverse magnetic field and to move a bubble in either direction between said assembly loop and said storage loop under the control of a predetermined magnetic field.

8. A memory as claimed in claim 4 wherein said second propagation circuit means comprises:

a first short parallel bar propagation circuit; pump means having an input and an output, said input connected to said first short propagation circuit and adapted to receive a magnetic bubble therefrom; said pump means adapted to release a bubble at said output upon receipt of a bubble at said input, under the control of said first oscillating transverse magnetic field; and a second short parallel bar propagation circuit connected to said pump means output.

9. A memory as claimed in claim 1 wherein said pump means comprises:

a number of spaced generally parallel magnetic bars, said bars positioned such that alternate ends of the bars are adjacent and the spacing between said bars are alternately narrow and large.

10. In a magnetic bubble domain memory having a parallel bar assembly loop and a number of parallel bar storage loops positioned perpendicular to the assembly loop, each of the storage loops having a first and second track, the assembly loop having at least one track and each of the storage loops being connected to the assembly loop by a transfer circuit means, each of the transfer circuit means comprising:

first means substantially perpendicular to said storage loop and adapted to transfer bubbles from the first track to the second track, said first means having a first bar positioned at the end of said first and second track slightly offset from the centerline between said first and second track; and second means substantially perpendicular to said assembly loop and adapted to transfer bubbles between said storage loop and said one track, said second means having a second bar positioned with one end forming part of said one track and with the other end overlapping said first bar.

11. A transfer circuit as claimed in claim 10 wherein said first bar is chevron shaped.

12. In a magnetic bubble domain memory having a parallel bar assembly loop and a number of parallel bar storage loops positioned perpendicular to the assembly loop, each of the storage loops having a first and second track, the assembly loop having at least one track and each of the storage loops being connected to the assembly loop by a transfer circuit means, each of the transfer circuit means comprising:

first means substantially perpendicular to said storage loop and adapted to transfer bubbles from the first track to the second track, said first means having a first bar positioned at the end of said first and second tracks slightly offset from the centerline between said tracks; and second means substantially perpendicular to said assembly loop and adapted to transfer bubbles between said storage loop and said one track, said second means having third and fourth bars positioned end to end, with said third bar forming part of said one track and with the fourth bar overlapping said first bar.

13. In a magnetic bubble domain memory having a parallel bar assembly loop and a number of parallel bar storage loops positioned perpendicular to the assembly loop, each of the storage loops having a first and second track, the assembly loop having at least one track and each of the storage loops being connected to the assembly loop by a transfer circuit means, each of the transfer circuit means comprising:

first means substantially perpendicular to said storage loop and adapted to transfer bubbles from the first track to the second track, said first means having a first bar positioned at the end of said first and second track slightly offset from the centerline between said first and second track; and second means substantially perpendicular to said assembly loop and adapted to transfer bubbles between said storage loop and said one track, said second means having third and fourth bars positioned end to end, with said third bar forming part of said one track and with the fourth bar adjacent the first track in storage loop; and fifth and sixth bars positioned end to end, with said fifth bar forming part of said one track and with the sixth bar adjacent the second track in the storage loop.

14. In a magnetic bubble domain memory having a parallel bar assembly loop and a number of parallel bar storage loops positioned perpendicular to the assembly loop, each of the storage loops having a first and second track, the assembly loop having at least one track and each of the storage loops being connected to the assembly loop by a transfer circuit means, each of the transfer circuit means comprising:

first means substantially perpendicular to said storage loop and adapted to transfer bubbles from the first track to the second track, said first means having a first bar positioned at the end of said first and second track slightly offset from the centerline between said first and second track; and second means substantially perpendicular to said assembly loop and adapted to transfer bubbles between said storage loop and said one track.

15. A transfer circuit as claimed in claim 14 wherein said first bar is chevron shaped.

16. A transfer circuit as claimed in claim 14 wherein said second means comprises:

a second bar positioned with one end forming part of said one track in the assembly loop and the other end being adjacent to the center of said first bar; and a protrusion on said second bar perpendicular to said second bar.

17. A transfer circuit as claimed in claim 14 wherein said second means comprises:

a third bar positioned with one end forming part of (the first) said one track in the assembly loop and the other end adjacent to first track in the storage loop;

a fourth bar positioned with one end forming part of (the first) said one track in the assembly loop and the other end adjacent to the second track in the storage loop; and a protrusion on said third bar positioned perpendicular to said third bar.

* * * * *